Patented Apr. 23, 1946

2,398,781

UNITED STATES PATENT OFFICE 2,398,781

ANTISEPTIC ICE

Lawrence Frandsen, Seattle, Wash., assignor to National Antiseptics, Inc., Seattle, Wash., a corporation No Drawing. Application February 15, 1941, Serial No. 379,039½

6 Claims. (Cl. 99—222)

My present invention relates to an antiseptic particularly adapted for the packing and preservation of food stuffs and the like.

There has long been a need for a non-toxic antiseptic that is stable in either crystalline, powder, or solution form and that, in any of these forms, may be used in the preserving of food without discoloration of the food, or a resultant chemical reaction in the presence of organic materials. In certain previous attempts at improving the process of storing food, chlorine compounds have been used by themselves or with other chemical elements or substances to preserve food and to prevent bacterial or autolytic action. Common complaints from such chlorine treatment of food has been that shrinkage is promoted, palatability is reduced or destroyed or discoloration and occasionally bleaching occurs.

Other processes of food preservation have entailed the use of a salt of benzoic acid but this has resulted in material alterations in the food flavor, chemical reactions that are undesirable or other changes that detract from the food when its use as such as desired.

Essentially my invention consists in combining one of the compounds of the chloramine group with special reference to one of the soluble chloramines such as chloramine T, with one of the several salts of benzoic acid to produce a new and useful antiseptic hitherto unknown. Experience teaches that the proportions of the components of this mixture are variable to meet different conditions and types of foods, but I find that only in a certain range of proportions is there to be found a desirable compatability for my purposes.

A prime object of my invention, therefore, has been the provision of an antiseptic that is stable and safely and easily used.

Another object of my invention relates to the provision of a food preserving antiseptic that may be readily combined with water or other liquids and used as a dip for food stuffs.

A further object of my invention has been to provide an antiseptic compound that may be incorporated with water and frozen into ice which may then be used to pack food for storage or transportation.

Other and more specific objects will be apparent from the following description.

In one form of my invention to produce my mixture, I combine one chloramine compound with one of either of several salts of benzoic acid in the broad proportions of approximately 25% to 50% of the chloramine compound and the remainder of the mixture is from 50% to 75% as the case may be of the benzoic acid salts. For example one of the ideal mixtures for use in preserving freshly caught salmon, where the mixture has been added to water that was later frozen into ice, tempered and crushed or ground is the following: chloramine T compound 33⅓% and the balance of the mixture a salt of benzoic acid, namely, sodium benzoate in the proportion of 66⅔%.

Of the several salts of benzoic acid, my experiments have disclosed that four are compatible with the chloramine compounds. These are sodium, potassium, magnesium and calcium. Each of these elements has an efficacy in my mixture that is desirable although I prefer to use the sodium benzoate mentioned above. I do not intend by this statement, however, to limit the scope of my invention solely to sodium benzoate.

When one of these chloramine compounds such as chloramine T is combined with one of the four mentioned salts in the proportions described the resulting antiseptic is stable in the presence of organic materials, either liquid or solid. The mixture withstands freezing and has a strength sufficient to give germicidal results. Observation discloses that in using this antiseptic to preserve animal tissue, no discoloration results from the antiseptic even when there is actual contact with exposed flesh. It is to be noted that the antiseptic stabilizes cut and exposed surfaces of fish, for example, and by preventing or retarding bacterial and autolytic changes, prevents the usual shrinkage of the fish. This really is a preservation of the natural juices in the flesh and a consequent preservation of the natural palatability that is often lost when fish and other animal tissue as well as vegetable matter is ice packed for preservation and storage.

In making an antiseptic ice, I mix from 12 to 48 ounces of my antiseptic mixture with a ton of water and stir it thoroughly so that the water becomes thoroughly impregnated with the chemical compound. I freeze this mixture into cakes in a commercial refrigerating plant to produce cake ice having antiseptic qualities. Still freezing appears the best to follow during this stage as thereby the dissipation of the antiseptic content throughout the water is not disturbed. An alternate form of freezing is to form scale or "flake" ice or sheet ice according to the well known cold tube or cold plate freezing methods.

This antiseptic mixture in the ground or crushed ice does not harm the granular form of the ice nor cause it to have an accelerated melting action. Repeated uses under careful observation show a marked stability in the mixture and a great decrease in the bacteria normally present in ice packed salmon.

In producing a dip, the anticeptic is mixed in approximately the above indicated proportions with water and the food or material to be treated is merely immersed therein. Occasionally in making a dipping solution these proportions are altered to include a greater amount of the antiseptic mixture when a more rapid germicidal action is desired. This can be done without harm as even strong mixtures can be handled in contact with the hands.

I claim:

1. An antiseptic ice, comprising a salt of benzoic acid mixed with chloramine T.

2. An antiseptic ice, comprising sodium benzoate and chloramine T.

3. An antiseptic ice, comprising a quantity of sodium benzoate combined with one-half as much chloramine T.

4. An antiseptic ice, comprising approximately two-thirds a salt of benzoic acid and the remainder chloramine T, said composition being employed in a concentration of not less than twelve ounces nor more than forty-eight ounces mixed with a ton of fresh water.

5. An antiseptic ice, comprising a composition of a salt of sodium benzoate and chloramine T in the amount of not less than 12 ounces nor more than 48 ounces mixed with a ton of fresh water.

6. An antiseptic ice, comprising a water soluble chloramine T and a salt of benzoic acid compatible therewith, said composition being formed of two parts of the salt of benzoic acid and one part of the chloramine T and employed in the amount of not less than 12 ounces nor more than 48 ounces mixed with a ton of fresh water.

LAWRENCE FRANDSEN.